(12) United States Patent
Kim et al.

(10) Patent No.: US 8,767,074 B2
(45) Date of Patent: Jul. 1, 2014

(54) SYSTEM AND METHOD OF ASSISTING VISIBILITY OF DRIVER

(75) Inventors: Joo Hyun Kim, Gyeonggi-do (KR); Kyoung Joong Min, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 352 days.

(21) Appl. No.: 13/159,667

(22) Filed: Jun. 14, 2011

(65) Prior Publication Data

US 2012/0218410 A1      Aug. 30, 2012

(30) Foreign Application Priority Data

Feb. 28, 2011   (KR) .................. 10-2011-0017830

(51) Int. Cl.
*H04N 7/18* (2006.01)
*B60R 19/48* (2006.01)

(52) U.S. Cl.
CPC ......... B60R 19/483 (2013.01); *B60R 2300/108* (2013.01)
USPC ........................................................ 348/148

(58) Field of Classification Search
None
See application file for complete search history.

(56) References Cited

U.S. PATENT DOCUMENTS

| | | | | |
|---|---|---|---|---|
| 6,803,955 | B1 * | 10/2004 | Yosida | 348/272 |
| 8,248,496 | B2 * | 8/2012 | Sekine | 348/278 |
| 2008/0211922 | A1 * | 9/2008 | Murashima et al. | 348/208.99 |
| 2009/0159799 | A1 * | 6/2009 | Copeland et al. | 250/338.1 |
| 2010/0038543 | A1 * | 2/2010 | Toda et al. | 250/339.05 |
| 2010/0074469 | A1 * | 3/2010 | Nakamori et al. | 382/103 |
| 2010/0195908 | A1 * | 8/2010 | Bechtel et al. | 382/167 |
| 2010/0201816 | A1 * | 8/2010 | Lee et al. | 348/148 |
| 2010/0295947 | A1 * | 11/2010 | Boulanger | 348/164 |
| 2011/0069189 | A1 * | 3/2011 | Venkataraman et al. | 348/218.1 |
| 2011/0122308 | A1 * | 5/2011 | Duparre | 348/340 |
| 2012/0170838 | A1 * | 7/2012 | Wang et al. | 382/165 |

FOREIGN PATENT DOCUMENTS

KR   10-2008-0029051 A      3/2008

OTHER PUBLICATIONS

Koyama, S.; Inaba, Y.; Kasano, Masahiro; Murata, T., "A Day and Night Vision MOS Imager With Robust Photonic-Crystal-Based RGB-and-IR," IEEE Transactions on Electron Devices, vol. 55, No. 3, pp. 754,759, Mar. 2008.*

* cited by examiner

*Primary Examiner* — Dave Czekaj
*Assistant Examiner* — Tyler W Sullivan
(74) *Attorney, Agent, or Firm* — Lowe Hauptman & Ham, LLP (57) ABSTRACT

A system includes a camera module, a processor, and a display drive unit. The camera module includes a lens, a color filter array having an IR filter, an R filter, a G filter, and a B filter, and an image sensor. The number of IR filters is larger than that of G filters, and the number of G filters is larger than that of R filters or B filters. The processor includes a signal extraction unit that extracts an RGB image signal and an IR image signal from an electrical source image signal from the camera module, a lane pattern image data generating unit that generates image data, a pedestrian image data generating unit that generates pedestrian image data. The display drive unit implements image data generated by the lane pattern image data generating unit and the pedestrian image data generating unit through a display.

17 Claims, 3 Drawing Sheets

| 1_IR | 2_IR | 3_IR | 4_IR | 5_IR | 6_IR | 7_IR | 8_IR |
|---|---|---|---|---|---|---|---|
| 9_IR | 10_G | 11_IR | 12_B | 13_IR | 14_G | 15_IR | 16_B |
| 17_IR | 18_IR | 19_IR | 20_IR | 21_IR | 22_IR | 23_IR | 24_IR |
| 25_IR | 26_R | 27_IR | 28_G | 29_IR | 30_R | 31_IR | 32_G |
| 33_IR | 34_IR | 35_IR | 36_IR | 37_IR | 38_IR | 39_IR | 40_IR |
| 41_IR | 42_G | 43_IR | 44_B | 45_IR | 46_G | 47_IR | 48_B |
| 49_IR | 50_IR | 51_IR | 52_IR | 53_IR | 54_IR | 55_IR | 56_IR |
| 57_IR | 58_R | 59_IR | 60_G | 61_IR | 62_R | 63_IR | 64_G |

FIG. 3

| | | | | | | | |
|---|---|---|---|---|---|---|---|
| | 10_G | | 12_B | | 14_G | | 16_B |
| | | | | | | | |
| | 26_R | | 28_G | | 30_R | | 32_G |
| | | | | | | | |
| | 42_G | | 44_B | | 46_G | | 48_B |
| | | | | | | | |
| | 58_R | | 60_G | | 62_R | | 64_G |

SYSTEM AND METHOD OF ASSISTING VISIBILITY OF DRIVER

CROSS-REFERENCE TO RELATED APPLICATIONS

This application claims the benefit of Korean Patent Application No. 10-2011-0017830 filed with the Korea Intellectual Property Office on Feb. 28, 2011, the disclosure of which is incorporated herein by reference.

BACKGROUND OF THE INVENTION

1. Field of the Invention

The present invention relates to a system and a method for assisting visibility of a driver, and more particularly, to a system and a method for assisting visibility of a driver capable of implementing a nighttime color image required to recognize a pedestrian and an image of displaying a lane required to warn a lane departure using a single camera module.

2. Description of the Related Art

In recent vehicle technologies, in order to improve convenience and safety of drivers during drive of vehicles, various systems in which cameras are installed at front, rear, right, and left sides of the vehicles to check images through displays of dashboards in front of driver's seat have been researched and already started to be applied.

As one of the systems for consulting convenience of drivers, a night vision system (NVS), which is an apparatus for assisting visibility of a driver during drive of a vehicle in a dark environment, such as a nighttime drive, radiates infrared light forward from a vehicle and photographs the infrared light to provide an image to the driver.

A horizontal angle of view of a camera module required in the NVS is about 17° and requires resolution of a video graphic array (VGA) of 640×480 or more to recognize a pedestrian.

Meanwhile, in addition to the NVS, another one of the systems for consulting convenience of drivers, a lane departure warning system (LDWS) is provided as a safety apparatus to detect a road image in front of a vehicle from a camera attached to the vehicle to recognize the lane where the vehicle is currently running, and alarm an alert sound if the vehicle is going to depart from the lane due to the driver's carelessness or drowsy driving.

Since the camera module required in the LDWS must recognize both of far and near lanes in front of the vehicle, a horizontal angle of view of the camera module is needed to be about 40° that is larger than that required in the NVS. In addition, since it is needed to recognize only the lane formed in a simple pattern, it is needed to satisfy resolution of a quarter video graphic array (QVGA) of 320×240 that is lower than that required in the NVS.

Accordingly, in order to implement the NVS and the LDWS using a single camera module, a horizontal angle of view of a lens of about 40° or more and resolution of a VGA of 640×480 or more are needed.

However, headlamps of the vehicle use a yellow light having a wavelength of 555 nm with good sensitivity to human's eyes. In order to prevent a blooming phenomenon in which a night vision image is saturated due to light of headlamps of the driver's vehicle and a vehicle, which is coming from an opposite side, infrared (IR) pass filters through which only light of 650 nm or more passes are installed in the most camera modules used in the NVS. In addition, in order to avoid deterioration of image quality due to infrared light departing from a visible region, IR cut filters are installed between lenses and image sensors of camera modules used in the LDWS to block infrared light.

For this reason, the camera module used in the NVS cannot implement a color image to recognize a color of the lane, and the camera module used in the LDWS cannot identify objects in a low illuminance environment. Accordingly, it is difficult to simultaneously implement the image representing the lane and the image representing the pedestrian during the nighttime driving using the single camera module. Therefore, in order to simultaneously implement the image representing the lane and the image representing the pedestrian during the nighttime, the respective camera modules must be used to be correspondingly required in the respective systems. As a result, implements of the system for assisting visibility of the driver are costly.

In addition, when the NVS shows an image representing a pedestrian, since the IR pass filter is disposed in the camera module, a black and white image is implemented to make it difficult for the driver to see the display and discriminate the pedestrian.

SUMMARY OF THE INVENTION

The present invention has been invented in order to overcome the above-described problems and it is, therefore, an object of the present invention to provide a system for assisting visibility of a driver capable of simultaneously implementing a nighttime image required to recognize a pedestrian and a lane pattern image required for a lane departure alert using a single camera module, and assisting visibility of the driver by providing a pedestrian display image implemented in color, and a method of assisting visibility of a driver using the same.

In accordance with one aspect of the present invention to achieve the object, there is provided a system for assisting visibility of a driver including: a camera module constituted by a lens for receiving an optical signal of an image in front of a vehicle, a color filter array having an IR filter, an R filter, a G filter, and a B filter, and an image sensor for converting the received optical signal into an electrical source image signal required to perform an image processing; a signal extraction unit for extracting an RGB image signal and/or an IR image signal from the electrical source image signal output from the camera module; a lane pattern image data generating unit constituted by an RGB interpolation part for interpolating the extracted RGB image signal, a signal expansion part for expanding a data size of the interpolated RGB image signal, and a signal conversion part for converting the expanded RGB image signal into an YCbCr image signal, to generate data required for a lane pattern display image; a pedestrian image data generating unit constituted by an IR interpolation part for interpolating the extracted IR image signal and a signal synthesizing part for synthesizing the YCbCr image signal output from the signal conversion part to the interpolated IR image signal, to generate data required for a pedestrian display image; and a display drive unit for implementing image data generated from the lane pattern image data generating unit and/or the pedestrian image data generating unit through a display.

In addition, in the color filter array, the IR filter may be disposed in an $n^{th}$ row direction, and the IR filter and any one of the B, G, and R filters may be alternately disposed in an $(n+1)^{th}$ row direction.

Further, the system may further include a cropping unit for cropping the remaining portion, except for an interested region corresponding to a horizontal angle of view of the lens required to recognize the pedestrian, before performing an image signal processing at the pedestrian image data generating unit.

Furthermore, the lane pattern image data generating unit may further include a white balance applying part for applying a white balance to the input signal, and a first filtering part for removing an element acting as noises from the RGB image signal extracted by the signal extraction unit.

In addition, the pedestrian image data generating unit may further include a brightness improvement part for improving a brightness value of a low signal level due to a dark environment during the nighttime driving, and a second filtering part for removing an element acting as noises from the IR image signal extracted by the signal extraction unit.

Further, the signal synthesizing part may use the IR image signal interpolated by the IR interpolation part as a darkness (light and shade) signal Y and Cb and Cr signals of the YCbCr image signal output from the signal conversion part as a color difference signal, and synthesize the Y signal and the Cb and Cr signals.

Furthermore, the system may further include a lane recognition unit for recognizing a lane from the image data generated from the lane pattern image data generating unit, and a lane departure determination unit for determining whether the vehicle departs from the lane recognized by the lane recognition part, and an alarm unit for generating an alert when the vehicle departs the lane.

In addition, the system may further include a pedestrian recognition unit for recognizing a pedestrian from the image data generated from the pedestrian image data generating unit, a distance detection unit for detecting a distance from the pedestrian, and an alarm unit for producing region information at which the pedestrian is positioned based on the pedestrian recognition unit and the distance detection unit and generating an alert when the pedestrian is in a hazard area.

In accordance with another aspect of the present invention to achieve the object, there is provided a method of assisting visibility of a driver including: (a) receiving an optical signal of an image in front of a vehicle from a camera module and converting the optical signal into an electrical source image signal to be image-processed; (b) extracting an RGB image signal and/or an IR image signal from the electrical source image signal; (c) interpolating the RGB image signal extracted through Step (b), expanding a data size of the interpolated RGB image signal, and then converting the RGB image signal into an YCbCr image signal to generate data required for a lane pattern image; (d) interpolating the IR image signal extracted through Step (b), and synthesizing the YCbCr image signal converted through Step (c) to the interpolated IR signal to generate data required for a pedestrian display image in color image quality; and (e) implementing the image data generated through Steps (c) and/or (d) through a display.

In addition, the method may further include, before the image signal processing of Step (d), performing a cropping process of the remaining portion, except for an interested region corresponding to a horizontal angle of view of the lens required to recognize the pedestrian.

Further, the method may further include recognizing the lane from the image data generated through Step (c), and determining whether the vehicle departs from the recognized lane to generate an alert when the vehicle departs from the lane.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, a circuit board for signal transmission of the present invention will be described in detail with reference to the accompanying drawings. The following embodiments are provided as examples to fully convey the spirit of the invention to those skilled in the art. Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

Figure 1:
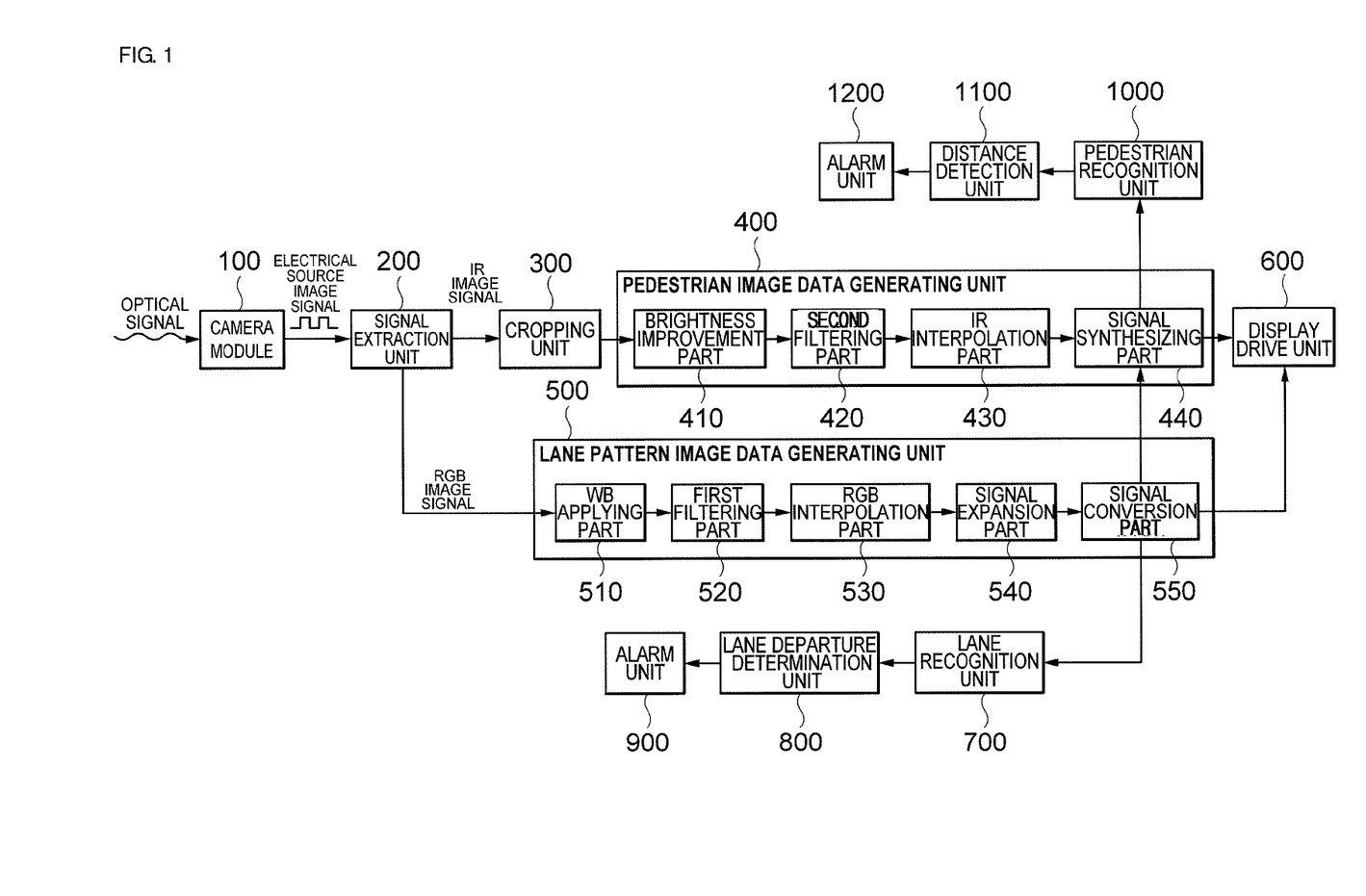
FIG. 1 is a block diagram showing configuration of a system for assisting visibility of a driver in accordance with an exemplary embodiment of the present invention.

FIG. 1 is a block diagram showing configuration of a system for assisting visibility of a driver in accordance with an exemplary embodiment of the present invention.

Referring to FIG. 1, the system for assisting visibility of a driver in accordance with an exemplary embodiment of the present invention may include a lens (not shown) for receiving an optical signal of an image in front of a vehicle, a color filter array (not shown) constituted by an IR filter, an R filter, a G filter, and a B filter, a camera module 100 constituted by an image sensor (not shown) for converting the received optical signal into an electrical source image signal needed for an image process, a signal extraction unit 200 for extracting an RGB image signal and/or an IR image signal from the electrical source image signal output from the camera module 100, a lane pattern image data generating unit 500 for generating data required in an image for displaying a lane pattern (hereinafter, referred to as a lane pattern image) using the extracted RGB image signal, a pedestrian image data generating unit 400 for generating data required in an image for displaying a pedestrian in a color image (hereinafter, referred to as a pedestrian image) using the extracted IR image signal, and a display drive unit 600 for implementing an image data generated from the lane pattern image data generating unit 500 and/or the pedestrian image data generating unit 400 through a display.

In order to perform an image signal process (ISP) through an image pipe (I-pipe), first, an optical signal of an image in front of the vehicle received by the lens must be converted into an electrical source image signal require in an image process, which may be performed by the image sensor. Here, the image sensor may use conventional image sensors such as a charge coupled device (CCD) image sensor, a complementary metal oxide semiconductor (CMOS) image sensor, and so on, but it is not limited thereto.

Since a photo-sensitive device constituting an image sensor (a small photo-sensitive diode referred to as a photosite) cannot detect spectral characteristics but generally measure intensity of an optical signal of a subject, a color filter array (CFA) may be disposed to pass only the optical signal having a certain frequency bandwidth to represent a color image. However, since the system for assisting visibility of a driver in accordance with an exemplary embodiment of the present invention is provided to implement a pedestrian image and/or a lane pattern image using the single camera module 100 and implement the pedestrian image in a color image, unlike the color filter array used in the conventional LDWS or the NVS, a color filter array constituted by an IR filter, an R filter, a G filter, and a B filter may be used.

Figure 2:
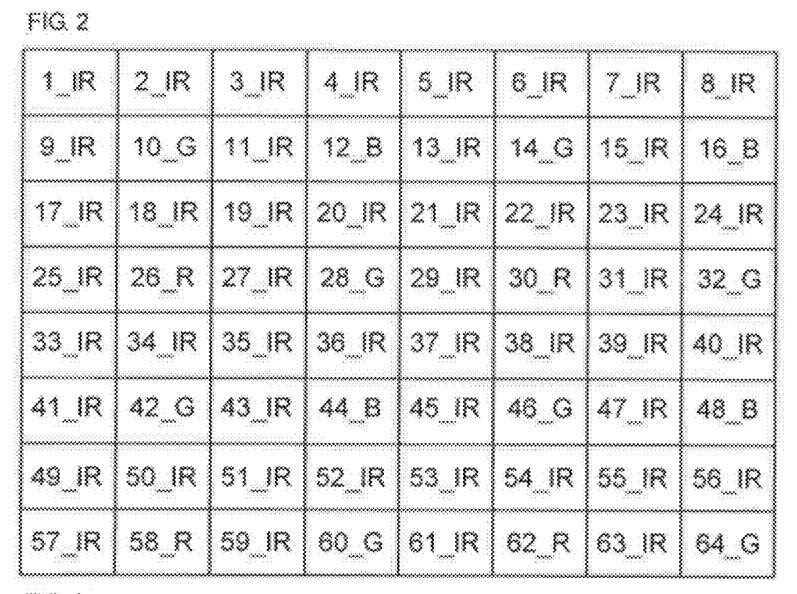
FIG. 2 is a view showing a 8×8 color filter array used in the system for assisting visibility of a driver in accordance with an exemplary embodiment of the present invention.

FIG. 2 is a view showing an 8×8 color filter array used in the system for assisting visibility of a driver in accordance with an exemplary embodiment of the present invention.

Here, the B filter is a color filter for transmitting only a signal corresponding to blue color information from the optical signal entering through the lens, the G filter is a color filter for transmitting only a signal corresponding to green color information, the R filter is a color filter for transmitting only a signal corresponding to red color information, and the IR filter is a filter for transmitting only a predetermined infrared signal. Referring to FIG. 2, in an $n^{th}$ row direction (here, n is a natural number), only the IR filter may be disposed, and in an $(n+1)^{th}$ row direction, the IR filter and any one filter of the B, G, and R filters may be alternately disposed. However, since a human vision system is most sensitive to a luminance element, i.e., a green (G) element, which is detected by most of sensors, but blue (B) and red (R) elements, whose resolutions are less provided in the human vision system, are detected by a small number of sensors, the B, G and R filters may be disposed at a ratio of 1:2:1.

When the IR, R, G, and B filters are disposed as described above, a ratio of the IR, R, G and B filters is 12:1:2:1. Accordingly, even though the number of pixels through which only optical signals having an IR frequency bandwidth passes becomes 75%, for example, when an image sensor having resolution of 1280×960 is used, it is possible to satisfy image quality of the VGA grade or more required to recognize the pedestrian using an output image implemented by the display drive unit 600. In addition, even though the number of pixels through which only optical signals having an RGB frequency bandwidth passes becomes 25%, when the image sensor having resolution of 1280×960 is used, it is possible to satisfy image quality of the QVGA grade or ore required to recognize the lane pattern.

While the system has been described with reference to the 8×8 color filter array having a ratio of the IR, R, G, and B filters of 12:1:2:1 and the image sensor having resolution of 1280×960 corresponding thereto, color filter arrays having various sizes (for example, a 16×16 size of color filter array) and image sensors having various resolutions (for example, resolutions of 1920×1200, 2048×1536, and so on) corresponding thereto may be used depending on requirements of image quality of the pedestrian image and the lane pattern image or capacities of a central processing unit (CPU) or a memory, and thus, a ratio of the IR, R, G, and B filters may be variously provided.

When the optical signal received by the lens is converted into the electrical source image signal by the image sensor to be output, the signal extraction unit 200 may selectively extract an RGB image signal or an IR image signal from the electrical source image signal.

Since the optical signal of the IR bandwidth radiated from an IR transmitter is used to generate data for implementing a pedestrian image and the optical signal of the visible light bandwidth is used to generate data for implementing a lane pattern image, the signal extraction unit 200 separates an RGB image signal or an IR image signal from the electrical source image signal output from the camera module 100 to selectively extract one of them.

For this, when the 8×8 color filter array shown in FIG. 2 is used, only pixel values of the R, G, and B filters may be selectively extracted as the RGB image signal from the electrical source image signal corresponding to rows in which the R, G, and B filters of the color filter array are disposed, and only an IR pixel value may be selectively extracted as the IR image signal from the electrical source image signal corresponding to all rows of the color filter array.

When the RGB image signal is separated and extracted by the signal extraction unit 200, the lane pattern image data generating unit 500 may generate data required in the lane pattern image using the extracted RGB image signal.

The lane pattern image data generating part 500 as described above may include an RGB interpolation part 530 for interpolating the RGB image signal, a signal expansion part 540 for expanding a size of data of the interpolated RGB image signal to a size of data of the IR image signal interpolated by an IR interpolation part 430, and a signal conversion part 550 for converting the expanded RGB image signal into a YCbCr image signal.

Since each of the R, G, and B filters of the 8×8 color filter array shown in FIG. 2 has one color information of three colors of red, green, and blue, in order to obtain a perfect color image, the RGB interpolation part 530 may perform an algorithm of recovering the other two color information, which are not included in a corresponding filter, with reference to the color information included in the corresponding filter of the color filter array and the color information included in peripheral filters thereof.

A generally well-known method among methods of interpolating RGB image signals is bilinear interpolation using an average value of peripheral pixels. However, as described above, since the color filter array used in the system for assisting visibility of a driver in accordance with the present invention is constituted by the IR, R, G, and B filters, the interpolation used in the RGB interpolation part 530 of the present invention will be described below in detail.

Figure 3:
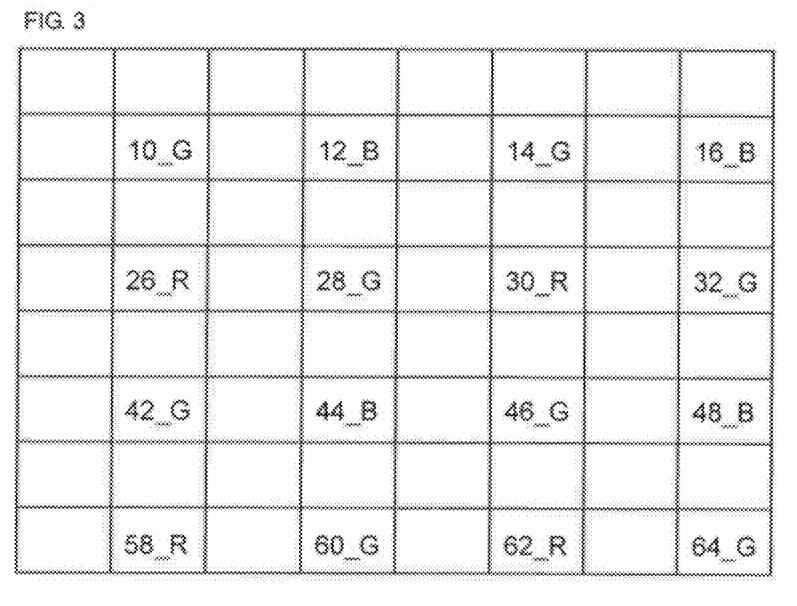
FIG. 3 is a view showing only R, G, and B filters in a color filter array used in the present invention of FIG. 2.

FIG. 3 is a view showing only the R, G, and B filters in the 8×8 color filter array shown in FIG. 2. Referring to FIG. 3, for example, when a 44$^{th}$ pixel having only a B value is interpolated, a G value of the 44$^{th}$ pixel may be interpolated by calculating an average of G values of four pixels (28$^{th}$, 42$^{th}$, 46$^{th}$, and 60$^{th}$ pixels), and an R value of the 44$^{th}$ pixel may be interpolated by calculating an average of R values of four pixels (26$^{th}$, 30$^{th}$, 58$^{th}$, and 62$^{th}$ pixels) disposed around the 44$^{th}$ pixels in diagonal directions. As described above, the interpolation performed in the RGB interpolation part 530 of the present invention may first extract only pixel values of the R, G, and B filters around the filter to be interpolated, except for a pixel value of the IR filter around the R, G, and B filters to be interpolated in the color filter array, thereby interpolating the RGB image signal according to the bilinear interpolation.

The signal expansion part 540 may receive the RGB image signal output from the RGB interpolation part 530 to perform an algorithm in which the data size of the RGB image signal is expanded to the data size of the IR image signal interpolated in the IR interpolation part 430.

When the RGB image signal is interpolated by the RGB interpolation part 530 using the 8×8 color filter array, as shown in FIG. 3, since the R, G, and B filters, except for the IR filter, have the data size of a 4×4 array, a signal synthesizing part 440 expands the data size (4×4 data size) of the RGB image signal, which is interpolated through a pre-process of synthesizing an YCbCr signal to the IR image signal having the data size of a 8×8 array, to the data size (8×8 data size) of the IR image signal. This may be performed by an image scaling method such as a bi-linear scaling method, a bi-cubic scaling method, or the like.

When the data size of the RGB image signal is expanded by the signal expansion part 540, the signal conversion part 550 may perform an algorithm of converting the RGB image signal into an image signal of an YCbCr color space through a matrix calculation as defined by the following equation 1 according to ITU.BT-709 Standard.

$$\begin{bmatrix} Y \\ Cb \\ Cr \end{bmatrix} = \begin{bmatrix} 0.2215 & 0.7154 & 0.0721 \\ -0.1145 & -0.3855 & 0.5 \\ 0.5016 & 0.4556 & -0.0459 \end{bmatrix} \begin{bmatrix} R \\ G \\ B \end{bmatrix}$$ [Equation 1]

A brightness element Y and a chroma element CbCr may be separated through the above calculation. Here, Y represents darkness (light and shade) information of the light, Cb is a difference between the darkness (light and shade) information Y and B, and Cr is a difference between the darkness (light and shade) information Y and R.

In general, the reason for converting the RGB signal into the YCbCr signal is that noises and clarity of the image are mainly related to the Y element. Accordingly, the calculation process can be simplified by processing only the Y element, rather than processing the entire RGB signal. In the present invention, in addition to the above reason, the converted YCbCr signal may be output to the signal synthesizing part 440 to be synthesized to the IR image signal to implement a pedestrian image in a color image. The method of synthesizing the YCbCr into the IR image signal will be described with reference to the signal synthesizing part 440 below.

When data for representing a lane pattern image are generated according to the RGB interpolation part 530, the signal expansion part 540 and the signal conversion part 550 included in the lane pattern image data generating unit 500, the display drive unit 600 may receive the signal data output from the lane pattern image data generating unit 500 to display a lane pattern image through the user's display.

Meanwhile, in order to implement an image having a clearer image quality, the lane pattern image data generating unit 500 may further include a white balance (WB) applying part 510 for performing an algorithm of applying a white balance to control a phenomenon in which the camera incorrectly recognizes a lane color due to the headlamps, and a first filtering part 520 for performing a noise removal algorithm of removing an element acting as noises from the extracted RGB image signal. Accordingly, the white balance applying part 510 may extract a point determined as a gray subject with respect to an input signal to estimate a color temperature based on color information of the gray subject, and appropriately adjust a color of the output signal by multiplying a gain appropriate to the RGB channel to correct it. The first filtering part 520 may remove noise elements through a method of generally applying a low pass filter (LPF), but the present invention is not limited thereto.

As described above, the image signal processing part for displaying the lane pattern image using the RGB image signal extracted from the signal extraction unit 200 has been described. Hereinafter, the image signal processing part for displaying a pedestrian image in a color image using the IR image signal extracted from the signal extraction unit 200 will be described.

When the IR image signal is separated and extracted by the signal extraction unit 200, the pedestrian image data generating unit 400 may generate data required for the pedestrian image in a color image using the extracted IR image signal.

The pedestrian image data generating unit 400 may include the IR interpolation part 430 for interpolating the extracted IR image signal, and the signal synthesizing part 440 for synthesizing an YCbCr image signal output from the signal conversion part 550 and the interpolated IR image signal.

The IR interpolation part 430 may interpolate the IR image signal using an average value of the IR filter signals around the R, G, and B filters. That is, in order to interpolate the IR image signal, signals corresponding to $10^{th}$, $12^{th}$, $14^{th}$, $16^{th}$, $26^{th}$, $28^{th}$, $30^{th}$, $32^{th}$, $42^{th}$, $44^{th}$, $46^{th}$ $48^{th}$, $58^{th}$, $60^{th}$, $62^{th}$ and $64^{th}$ pixels shown in FIG. 2 must be interpolated. For example, in the case of $10^{th}$ pixel, an average of IR pixel values disposed at upper, lower, left, and right sides around the $10^{th}$ pixel may be calculated to be interpolated. Similarly, the other $12^{th}$, $14^{th}$, $16^{th}$, $26^{th}$, $28^{th}$, $30^{th}$, $32^{th}$, $42^{th}$, $44^{th}$, $48^{th}$, $58^{th}$, $60^{th}$, $62^{th}$ and $64^{th}$ pixels may also interpolate the IR image signal through the same method.

When the IR image signal interpolated in the IR interpolation part 430 is output, the signal synthesizing part 440 may receive the signal to perform an algorithm of synthesizing the YCbCr image signal output from the signal conversion part 550 to the input IR image signal, generating a pedestrian image data in color image quality.

Specifically reviewing the algorithm of synthesizing the YCbCr image signal to the IR image signal, the IR image signal interpolated by the IR interpolation part 430 is considered as a light and shape signal Y. In addition, in the YCbCr signal converted by the signal conversion part 550, only a Cb signal and a Cr signal may be used as a color difference signal to synthesize the Y signal obtained from the IR image signal to the Cb and Cr signals obtained from the RGB image signal, generating pedestrian image data in color image quality in which color information is added to the IR image in which a dark place is exposed in bright.

When data for displaying a pedestrian image in color image quality are generated according to the IR interpolation part 430 and the signal synthesizing part 440 included in the pedestrian image data generating unit 400, the display drive unit 600 may receive signal data output from the pedestrian image data generating unit 400 to display a pedestrian image through the user's display.

Meanwhile, in order to implement a clearer quality of image, the pedestrian image data generating unit 400 may further include a brightness improvement part 410 for performing an algorithm of improving a low signal level value due to a dark environment during nighttime driving, and a second filtering part 420 for performing a noise removal algorithm of removing elements acting as noises from the extracted IR image signal, which are disposed before the IR interpolation part 430.

The brightness improvement part 410 may improve a brightness value of the input signal using a method such as gamma curve and histogram stretching, a histogram equalizer, or the like. In addition, the second filtering part 420 may remove noise elements through a method of applying a low pass filter (LPF), similar to the first filtering part 520. For convenience sake, the present invention discriminates the first filtering part 520 included in the lane pattern image data generating unit 500 and the second filtering part 420 included in the pedestrian image data generating unit 400, but it will be apparent to those skilled in the art that the first filtering part 520 and the second filtering part 420 may be installed in the same processing apparatus, if necessary.

Meanwhile, the system for assisting visibility of a driver in accordance with an exemplary embodiment of the present invention may further include, before signal processing of the pedestrian image data generating unit 400, a cropping unit 300 of cropping the remaining portion, except for interested regions, such that only the interested regions corresponding to the horizontal angle of view of the lens required to recognize the pedestrian can be signal-processed.

Figure 4:
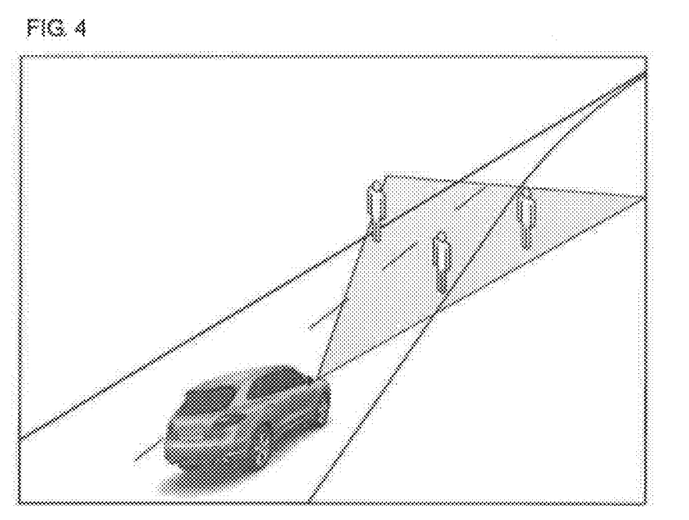
FIG. 4 is a view exemplifying a horizontal angle of view of a lens required to implement an image displaying pedestrians.

FIG. 4 is a view exemplifying a horizontal angle of view of a lens required to implement an image displaying pedestrians. Referring to FIG. 4, in the case of the pedestrian image, unlike the lane pattern image in which both far and near lanes in front of the vehicle must be recognized and displayed, since a subject disposed at a remote distance should be recognized and displayed, a horizontal angle of view of a lens required in a pedestrian display image is about 17°. Accordingly, before generating image data required to display a pedestrian, the remaining portion, except for the interested region at which the pedestrian is positioned, is cropping-processed according to position information of a preset image region, and then, only the image signal corresponding to the interested region may be processed to avoid unnecessary calculation.

In addition, the system for assisting visibility of a driver in accordance with the present invention may further include a lane recognition unit 700 for recognizing a lane from an image data generated from the lane pattern image data generating unit 500, a lane departure determination unit 800 for determining whether the vehicle departs from the lane recognized by the lane recognition unit 700, and an alarm unit 900 for generating an alert when the vehicle departs from the lane.

Using methods disclosed in Korean Patent Laid-open Publications (Application Nos. 20090059804, 20080033034), the lane recognition unit 700 may recognize kinds of lanes such as dotted lines through which a lane exchange is possible and a solid line through which a lane exchange is impossible, and colors of lanes such as a white line which is a general lane, a yellow line which is a center lane, and a blue line which is a bus-only lane, and the lane departure determination unit 800 may receive data from the lane recognition unit 700 to generate an alert using the alarm unit 900 when the vehicle approaches the solid line through which a lane exchange is impossible, or the center lane or the bus-only lane, more securely guaranteeing safety of the driver.

In addition, the system for assisting visibility of a driver in accordance with the present invention may further include a pedestrian recognition unit 1000 for recognizing a pedestrian from image data generated from the pedestrian recognition unit 1000, a distance detection unit 1100 for detecting a distance to a pedestrian recognized by the pedestrian recognition unit 1000, and an alarm unit 1200 for generating an alert when a pedestrian is in a hazard area by calculating region information that the pedestrian is positioned on the basis of the pedestrian recognition unit 1000 and the distance detection unit 1100.

Here, the pedestrian recognition unit 1000 may perform its function using a generally known technique disclosed in US Patent Publication No. 20070230792, and the distance detection unit 1100 may use a distance detection sensor for performing a function of detecting a distance to a pedestrian, specifically, an infrared sensor, a laser sensor, and so on.

Hereinafter, a method of assisting visibility of a driver using the method of assisting visibility of a driver in accordance with the present invention will be described.

Figure 5:
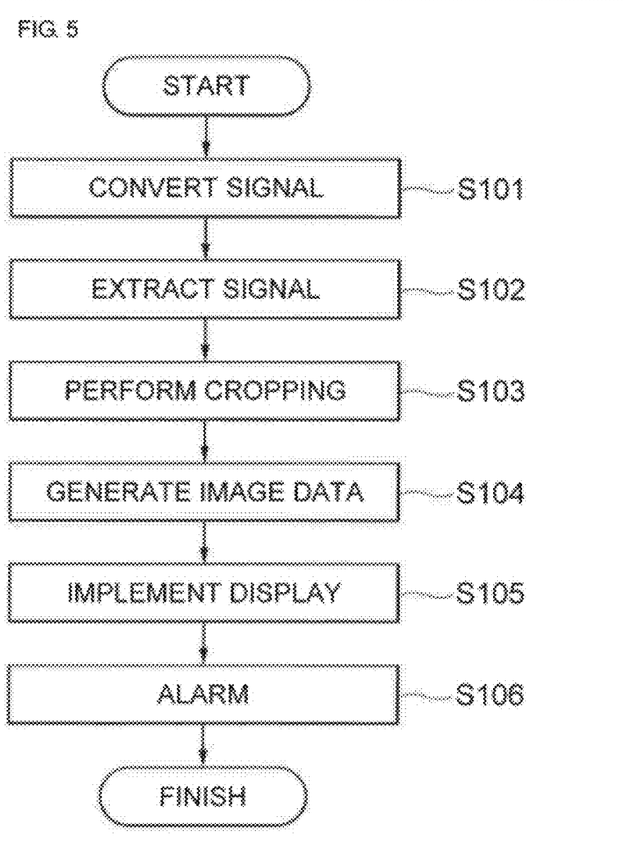
FIG. 5 is a flowchart showing sequence of a method of assisting visibility of a driver using the system assisting visibility of a driver in accordance with an exemplary embodiment of the present invention.

FIG. 5 is a flowchart showing sequence of the method of assisting visibility of a driver using the system assisting visibility of a driver in accordance with an exemplary embodiment of the present invention.

Referring to FIG. 5, the method of assisting visibility of a driver in accordance with the present invention may include, first, receiving an optical signal of an image in front of a vehicle from a camera and converting the optical signal into an electrical source image signal required to perform an imaging process (S101).

Next, extracting an RGB image signal or an IR image signal from the electrical source image signal (S102) may be performed in the signal extraction unit 200.

Next, the RGB image signal extracted in Step S102 may be interpolated in the lane pattern image data generating unit 500 and the size of the signal data may be expanded to the data size of the IR image signal to convert it into an YCbCr image signal to generate data required for the lane pattern image, or the IR image signal extracted in Step S102 may be interpolated in the pedestrian image data generating unit 400 and the YCbCr image signal output from the signal conversion part 550 may be synthesized to the interpolated IR image signal to generate data required for a pedestrian image in color image quality (S104). The method of interpolating the RGB and IR signals or expanding, converting and synthesizing the size of the signal data are as described above, and thus, detailed description thereof will not be repeated.

Meanwhile, in Step S104, in order to implement a clearer lane pattern image, an algorithm of applying a white balance to the input signal at the white balance applying part 510 and an algorithm of removing elements acting as noises from the first filtering part 520 may be further performed, and similarly, in order to implement a clearer pedestrian image, an algorithm of improving a brightness value of a signal level at the brightness improvement part 410 and an algorithm of removing elements acting as noises from the second filtering part 420 may be further performed.

When the data required for the lane pattern image or the pedestrian image are generated through Step S104, receiving the signal data output from the pedestrian image data generating unit 400 and/or the lane pattern image data generating unit 500 to display the lane pattern image and/or the pedestrian image through the user's display may be performed (S105), which may be performed by the display drive unit 600.

Meanwhile, the method of assisting visibility of a driver in accordance with the present invention may further include, before generating the pedestrian image data in Step S104, performing a cropping process of the remaining portion, except for the interested region corresponding to the horizontal angle of view of the lens required to recognize the pedestrian by the cropping unit 300 (S103).

In addition, the method may further include an alarm step (S106) of recognizing the lane from the image signal data generated from the lane pattern image data generating unit 500 and determining whether the vehicle departs from the recognized lane to generate an alert when the vehicle departs from the lane.

As can be seen from the foregoing, since the nighttime image required to recognize the pedestrian and the lane pattern image required to provide the lane departure alert can be simultaneously implemented using the single camera module, it is possible to assist visibility of a driver at a low cost.

In addition, the pedestrian display image during the nighttime drive can be implemented in a color image to make it possible for the driver to clearly recognize the pedestrian.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A system for assisting visibility of a driver, the system comprising:
   a camera module including
      a lens configured to receive an optical signal of an image in front of a vehicle,
      a color filter array having IR filters, R filters, G filters, and B filters, and
      an image sensor configured to convert the received optical signal into an electrical source image signal for image processing, wherein a number of the IR filters is larger than a number of the G filters, and the number of the G filters is larger than a number of the R filters or the B filters; and
   a processor including
      a signal extraction unit configured to extract an RGB image signal and an IR image signal from the electrical source image signal output from the camera module,
      a lane pattern image data generating unit including
         an RGB interpolation part configured to interpolate the extracted RGB image signal,
         a signal expansion part configured to expand a data size of the interpolated RGB image signal, and
         a signal conversion part configured to convert the expanded RGB image signal into a YCbCr image signal, to generate data for a lane pattern display image,
      a pedestrian image data generating unit including
         an IR interpolation part configured to interpolate the extracted IR image signal, and
         a signal synthesizing part configured to synthesize the YCbCr image signal output from the signal conversion part to the interpolated IR image signal, to generate data for a pedestrian display image, and
      a display drive unit configured to implement image data generated by the lane pattern image data generating unit and the pedestrian image data generating unit through a display.

2. The system according to claim 1, wherein, in the color filter array,
   the IR filters are disposed in an $n^{th}$ row direction, and
   the IR filters and any one of the B, G and R filters are alternately disposed in an $(n+1)^{th}$ row direction.

3. The system according to claim 1, wherein the processor further includes a cropping unit configured to crop a remaining portion, except for an interested region corresponding to a horizontal angle of view of the lens arranged to recognize the pedestrian, before performing an image signal processing at the pedestrian image data generating unit.

4. The system according to claim 1, wherein the lane pattern image data generating unit further includes
   a white balance applying part configured to apply a white balance to the input signal, and
   a first filtering part configured to remove a noise component from the RGB image signal extracted by the signal extraction unit.

5. The system according to claim 1, wherein the pedestrian image data generating unit further includes
   a brightness improvement part configured to improve a brightness value of a low signal level due to a dark environment during the nighttime driving, and
   a second filtering part configured to remove a noise component from the IR image signal extracted by the signal extraction unit.

6. The system according to claim 1, wherein the signal synthesizing part is configured to
   use the IR image signal interpolated by the IR interpolation part as a darkness signal Y,
   use Cb and Cr signals of the YCbCr image signal output from the signal conversion part as a color difference signal, and
   synthesize the Y signal and the Cb and Cr signals.

7. The system according to claim 1, wherein the processor further includes
   a lane recognition unit configured to recognize a lane from the image data generated by the lane pattern image data generating unit,
   a lane departure determination unit configured to determine whether the vehicle departs from the lane recognized by the lane recognition part, and
   an alarm unit configured to generate an alert when the vehicle departs from the lane.

8. The system according to claim 1, wherein the processor further includes
   a pedestrian recognition unit configured to recognize a pedestrian from the image data generated by the pedestrian image data generating unit,
   a distance detection unit configured to detect a distance from the pedestrian, and
   an alarm unit configured to produce region information at which the pedestrian is positioned based on the pedestrian recognition unit and the distance detection unit and to generate an alert when the pedestrian is in a hazard area.

9. A method of assisting visibility of a driver, the method comprising:
   (a) receiving an optical signal of an image in front of a vehicle from a camera module and converting the optical signal into an electrical source image signal to be image-processed, wherein
      the camera module includes a color filter array having IR filters, R filters, G filters, and B filters, and
      a number of the IR filters is larger than a number of the G filters, and the number of the G filters is larger than a number of the R filters or the B filters;
   (b) extracting an RGB image signal and an IR image signal from the electrical source image signal;
   (c) interpolating the RGB image signal extracted through Step (b), expanding a data size of the interpolated RGB image signal, and then converting the RGB image signal into a YCbCr image signal to generate data for a lane pattern image;
   (d) interpolating the IR image signal extracted through Step (b), and synthesizing the YCbCr image signal converted through Step (c) to the interpolated IR signal to generate data for a pedestrian display image in color image quality; and
   (e) implementing image data generated through Steps (c) and (d) through a display.

10. The method according to claim 9, further comprising, before the image signal processing of Step (d), performing a cropping process of a remaining portion, except for an interested region corresponding to a horizontal angle of view of the lens arranged to recognize the pedestrian.

11. The method according to claim 9, further comprising recognizing the lane from the image data generated through Step (c), and determining whether the vehicle departs from the recognized lane to generate an alert when the vehicle departs from the lane.

12. The system according to claim 1, wherein a ratio of the number of the R filters, the number of the G filters, and the number of the B filters is 1:2:1.

13. The system according to claim 1, wherein a ratio of the number of the IR filters, the number of the R filters, the number of the G filters, and the number of the B filters is 12:1:2:1.

14. The system according to claim 1, wherein a resolution of the image sensor is at least 1280×960.

15. The method according to claim 9, wherein a ratio of the number of the R filters, the number of the G filters, and the number of the B filters is 1:2:1.

16. The method according to claim 9, wherein a ratio of the number of the IR filters, the number of the R filters, the number of the G filters, and the number of the B filters is 12:1:2:1.

17. The method according to claim 9, wherein a resolution of the image sensor is at least 1280×960.

* * * * *